US008585816B2

(12) United States Patent
Shim et al.

(10) Patent No.: US 8,585,816 B2
(45) Date of Patent: Nov. 19, 2013

(54) LOW VISCOSITY, HIGH PARTICULATE LOADING DISPERSIONS

(75) Inventors: Anne K. Shim, Plaistow, NH (US);
Eugene N. Step, Newton, MA (US);
Agathagelos Kyrlidis, Malden, MA (US); Lang Nguyen, Lowell, MA (US);
Ian D. Morrison, Acton, MA (US)

(73) Assignee: Cabot Corporation, Boston, MA (US)

( * ) Notice: Subject to any disclaimer, the term of this patent is extended or adjusted under 35 U.S.C. 154(b) by 859 days.

(21) Appl. No.: 11/732,112

(22) Filed: Apr. 2, 2007

(65) Prior Publication Data

US 2007/0295242 A1    Dec. 27, 2007

Related U.S. Application Data

(60) Provisional application No. 60/800,630, filed on May 16, 2006.

(51) Int. Cl.
*C09D 11/00* (2006.01)

(52) U.S. Cl.
USPC ........ 106/31.65; 106/410; 106/476; 523/160; 523/210; 523/161

(58) Field of Classification Search
USPC .............................. 106/31; 523/160, 210, 495
See application file for complete search history.

(56) References Cited

U.S. PATENT DOCUMENTS

| | | | |
|---|---|---|---|
| 4,530,961 A | 7/1985 | Nguyen et al. | |
| 5,554,739 A | 9/1996 | Belmont | |
| 5,571,311 A | 11/1996 | Belmont et al. | |
| 5,630,868 A | 5/1997 | Belmont et al. | |
| 5,672,198 A | 9/1997 | Belmont | |
| 5,698,016 A | 12/1997 | Adams et al. | |
| 5,707,432 A | 1/1998 | Adams et al. | |
| 5,713,988 A | 2/1998 | Belmont et al. | |
| 5,803,959 A | 9/1998 | Johnson et al. | |
| 5,837,045 A | 11/1998 | Johnson et al. | |
| 5,837,046 A | 11/1998 | Tatum et al. | |
| 5,851,280 A | 12/1998 | Belmont et al. | |
| 5,885,335 A * | 3/1999 | Adams et al. ................ | 106/31.6 |
| 5,895,522 A | 4/1999 | Belmont et al. | |
| 5,900,029 A | 5/1999 | Belmont et al. | |
| 5,914,806 A | 6/1999 | Gordon II et al. | |
| 5,922,118 A | 7/1999 | Johnson et al. | |
| 5,952,429 A | 9/1999 | Ikeda et al. | |
| 5,964,935 A | 10/1999 | Chen et al. | |
| 5,976,233 A | 11/1999 | Osumi et al. | |
| 6,042,643 A | 3/2000 | Belmont et al. | |
| 6,150,433 A | 11/2000 | Tsang et al. | |
| 6,187,086 B1 | 2/2001 | Rehman | |
| 6,221,143 B1 | 4/2001 | Palumbo | |
| 6,235,829 B1 | 5/2001 | Kwan | |
| 6,328,894 B1 | 12/2001 | Chan et al. | |
| 6,350,579 B1 | 2/2002 | Nelson | |
| 6,392,786 B1 | 5/2002 | Albert | |
| 6,432,194 B2 | 8/2002 | Johnson et al. | |
| 6,478,863 B2 | 11/2002 | Johnson et al. | |
| 6,494,943 B1 | 12/2002 | Yu et al. | |
| 6,506,245 B1 | 1/2003 | Kinney et al. | |
| 6,580,545 B2 | 6/2003 | Morrison et al. | |
| 6,641,656 B2 | 11/2003 | Yu et al. | |
| 6,660,075 B2 | 12/2003 | Bergemann et al. | |
| 6,699,319 B2 | 3/2004 | Adams et al. | |
| 6,723,783 B2 | 4/2004 | Palumbo et al. | |
| 6,831,194 B2 | 12/2004 | Srinivas | |
| 6,896,726 B2 | 5/2005 | Bugnon et al. | |
| 6,911,073 B2 | 6/2005 | Adams et al. | |
| 6,960,250 B2 | 11/2005 | Luethge et al. | |
| 7,030,412 B1 | 4/2006 | Drzaic et al. | |
| 7,056,962 B2 | 6/2006 | Johnson et al. | |
| 7,173,078 B2 | 2/2007 | Lamprey et al. | |
| 7,459,491 B2 | 12/2008 | Tyvoll et al. | |
| 7,495,042 B2 | 2/2009 | Nguyen | |
| 7,968,191 B2 | 6/2011 | Hampden-Smith et al. | |
| 2001/0036994 A1 | 11/2001 | Bergemann et al. | |
| 2002/0147252 A1 | 10/2002 | Adams | |
| 2003/0101901 A1 | 6/2003 | Bergemann et al. | |
| 2004/0103822 A1 | 6/2004 | Champlin et al. | |
| 2004/0138340 A1 | 7/2004 | Bugnon et al. | |
| 2004/0138503 A1 | 7/2004 | Srinivas et al. | |
| 2005/0087104 A1 | 4/2005 | Nguyen | |
| 2005/0090582 A1* | 4/2005 | Ushirogouchi et al. ...... | 523/160 |
| 2005/0244644 A1 | 11/2005 | Hampden-Smith et al. | |
| 2007/0179463 A1 | 8/2007 | Takahashi et al. | |
| 2007/0224345 A1 | 9/2007 | Metz et al. | |
| 2007/0277699 A1 | 12/2007 | Bauer | |
| 2008/0087191 A1 | 4/2008 | Shim et al. | |

FOREIGN PATENT DOCUMENTS

| | | | |
|---|---|---|---|
| CA | 2351162 | | 12/2001 |
| EP | 1 528 089 A2 | | 5/2005 |
| EP | 1 027 388 | | 12/2005 |
| GB | 2001083 | | 1/1979 |
| GB | 6794425 | * | 9/2000 |
| JP | 2005132874 | | 5/2005 |
| WO | 9618689 | | 6/1996 |
| WO | 9715633 | | 5/1997 |
| WO | 9748769 | | 12/1997 |
| WO | 0046313 | | 8/2000 |
| WO | WO 00/52106 | | 9/2000 |
| WO | WO 01/25340 | | 4/2001 |
| WO | WO 03/057784 A2 | | 7/2003 |

OTHER PUBLICATIONS

International Search Report for International Patent Application No. PCT/US2007/011019.
International Search Report for Interantional Patent Application No. PCT/US2007/011704.
Fable J et al: "Rompp Chemie Lexikon, Bd. 2, 9. Auflage, Cm-G, Dielektrizitatskonstante [Dielectric contstant]" Chemie Lexikon. CM—G; [ROMPP Chemie Lexikon], Stuttgart, Thieme Verlag, DE, Jan. 1, 1990, XP002465381 p. 955-p. 956.
International Preliminary Report on Patentability for PCT/US2007/011019, mailed Nov. 27, 2008.
International Preliminary Report on Patentability for PCT/US2007/011704, mailed Nov. 27, 2008.

* cited by examiner

*Primary Examiner* — Melvin C Mayes
*Assistant Examiner* — Colette Nguyen

(57) ABSTRACT

The present invention relates to dispersions comprising particulate materials and a solvent, with an optional dispersant. The solvent has a low dielectric constant, and the particulate material is present at high loading levels. The resulting dispersion has been found to be stable and have a low viscosity, even at high particulate material loadings. Various uses for these dispersions are also disclosed.

38 Claims, No Drawings

LOW VISCOSITY, HIGH PARTICULATE LOADING DISPERSIONS

CROSS-REFERENCE TO RELATED APPLICATIONS

This patent application claims the benefit of U.S. Provisional Patent Application No. 60/800,630, filed May 16, 2006.

BACKGROUND OF THE INVENTION

1. Field of the Invention

The present invention relates to low viscosity dispersions comprising particulate material and a solvent.

2. Description of the Related Art

Pigments are finely divided, insoluble, solid particles which are, in general, not readily dispersible alone in liquid vehicles. A variety of techniques have been developed which can provide stable pigment dispersions. For example, dispersants can be added to the pigment to improve its dispersibility in a particular medium. Examples of dispersants include water-soluble polymers and surfactants.

The choice of dispersant depends on a variety of factors, including the morphological and chemical properties of the pigment and the type of liquid vehicle (resin or binder and solvent) in which the pigment is to be dispersed. However, the dispersant can often have a negative impact on properties such as color development and viscosity. This is particularly true at high pigment loading levels, such as greater than 10% pigment. For example, high surface area pigments are generally difficult to disperse without a high level of dispersant, but such a high level of dispersant often results in an unacceptable increase in the dispersion viscosity. Therefore, the amount of dispersant must be adjusted for the components used in order to obtain dispersion compositions with good overall properties.

Modified pigments, including modified colored pigments, have also been developed which provide dispersible pigment compositions, such as inks and coatings, with improved properties. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like. U.S. Pat. No. 5,885,335 describes the use of modified pigments having attached ionic and/or ionizable groups at specified levels in aqueous and non-aqueous ink and coating compositions. Also, U.S. Pat. Nos. 5,713,988 and 5,698,0916 describe modified pigments having various types of attached groups that can be used in non-aqueous inks and coatings. Furthermore, PCT International Publication No. WO 01/51566 describes a method of making a modified pigment by reacting a first chemical group and a second chemical group to form a pigment having attached a third chemical group. The first chemical group includes at least one nucleophile and the second chemical group includes at least one electrophile, or vice versa. This method may be used, for example, to prepare modified pigments having attached polymeric groups, which can be used in ink compositions and, in particular, inkjet ink compositions.

However, while these methods can be used to produce ionically modified pigments that can be dispersed in various types of non-aqueous compositions, it would be expected that these compositions would have high viscosity, particularly at high loading levels, in non-aqueous solvents. The reason for this is that the chargeable groups attached to the pigments would not be expected to be charged in a non-aqueous system and would therefore interact with each other, thereby increasing the viscosity. While such high viscosity systems may be useful in some applications, lower viscosity is generally more desirable since, for example, they are easier to process and can be applied using multiple techniques, including inkjet printing, dip coating, etc.

Therefore, while these methods provide dispersions of pigments, including modified pigments having attached groups, there remains a need for pigment dispersions, particularly those having high loadings of pigment, having improved performance properties, such as viscosity, thereby providing advantageous alternatives to previous modified pigments.

SUMMARY OF THE INVENTION

The present invention relates to a dispersion comprising a particulate material and a solvent. The particulate material is present in an amount of ≥25% by weight based on the total weight of the dispersion, the solvent has a dielectric constant of ≤50; and the dispersion has a viscosity of ≤50 cP.

The present invention further relates to a dispersion comprising a particulate material, a dispersant, and a solvent. The particulate material is an oxidized carbonaceous material or a modified pigment comprising a pigment having attached at least one ionic group, at least one ionizable group, or a mixture thereof, and this is present in an amount of ≥10% by weight based on the total weight of the dispersion. The dispersant forms associative structures in the solvent, which has a dielectric constant of ≤50, and the dispersion has a viscosity of ≤50 cP.

The present invention further relates to a dispersion comprising a particulate material, a dispersant, and a solvent. The particulate material is an oxidized carbonaceous material or is a modified pigment comprising a pigment having attached at least one ionic group, at least one ionizable group, or a mixture thereof. The dispersant forms associative structures in the solvent, and the dispersion further comprises associative structures of the dispersant. The solvent has a dielectric constant of ≤50, and the dispersion has a viscosity of ≤50 cP.

It is to be understood that both the foregoing general description and the following detailed description are exemplary and explanatory only and are intended to provide further explanation of the present invention, as claimed.

DETAILED DESCRIPTION OF THE INVENTION

The present invention relates to dispersions of particulate materials in a solvent. The dispersions have low viscosity even at high loading levels of particulate material. Preferably, the viscosity of the dispersion is ≤50 cP and can be measured using any method known in the art.

The particulate material used in the dispersions of the present invention may be organic, inorganic, or a combination of both. For example, the particulate material may be any type of pigment conventionally used by those skilled in the art for inks, coatings, and the like, such as carbonaceous pigments and organic colored pigments including pigments comprising a blue, black, brown, cyan, green, white, violet, magenta, red, orange, or yellow pigment. Mixtures of different pigments can also be used. Examples of suitable carbonaceous pigments include carbon products such as graphite, carbon black, vitreous carbon, carbon fibers, activated charcoal, activated carbon, and carbon nanotubes. The carbon may be of the crystalline or amorphous type. Finely divided forms of the above are preferred; also, it is possible to utilize mixtures of different carbons. Of these carbon products, carbon black is preferred.

Representative examples of carbonaceous pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Suitable classes of organic colored pigments include, for example, anthraquinones, phthalocyanine blues, phthalocyanine greens, diazos, monoazos, pyranthrones, perylenes, heterocyclic yellows, quinolonoquinolones, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The particulate material may also be a carbonaceous material such as carbon black that has been oxidized using an oxidizing agent in order to introduce ionic and/or ionizable groups onto the surface. Any of the carbon blacks described above can be used. Oxidized carbonaceous pigments, such as oxidized carbon blacks, prepared in this way have been found to have a higher degree of oxygen-containing groups on the surface. Oxidizing agents include, but are not limited to, oxygen gas, ozone, peroxides such as hydrogen peroxide, persulfates, including sodium, potassium, or ammonium persulfate, hypohalites such a sodium hypochlorite, oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, carbonaceous pigments, such as carbon black, prepared using other surface modification methods to introduce ionic or ionizable groups onto a pigment surface, such as chlorination and sulfonylation, may also be used.

The particulate material may also be a modified pigment comprising a pigment having attached at least one organic group, wherein the organic group comprises at least one ionic group, at least one ionizable group, or a mixture thereof. The pigment of the modified pigment may be any of those described above. Preferably the organic group is directly attached. The modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants. Other methods for preparing the modified pigments include reacting a pigment having available functional groups with a reagent comprising the organic group. Such modified pigments may be prepared using the methods described in the references incorporated above. In addition modified carbon blacks containing functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, each of which is also incorporated in their entirety by reference herein.

The attached organic group is chosen depending on a variety of factors, including the specific type of solvent as well as the intended use of the dispersion. This allows for greater flexibility by tailoring properties of the modified pigment dispersion. The organic group comprises at least one ionic group, at least one ionizable group, or a mixture of at least one ionic group and at least one ionizable group. An ionic group is either anionic or cationic and is associated with a counterion of the opposite charge including inorganic or organic counterions such as $Na^+$, $K^+$, $Li^+$, $NH_4^+$, $NR'_4^+$ acetate, $NO_3^-$, $SO_4^{-2}$, $OH^-$, and $Cl^-$, where R' represents hydrogen or an organic group such as a substituted or unsubstituted aryl and/or alkyl group. An ionizable group is one that is capable of forming an ionic group in water and is, to some extent, associated with its counterion in a medium of low polarity, unless additives are used to disassociate the counterion. Anionizable groups form anions and cationizable groups form cations. Thus, the organic group is an organic ionic or ionizable group. Such groups include those described in U.S. Pat. No. 5,698,016, the description of which is fully incorporated herein by reference.

For example, the modified pigment may comprise a pigment having attached at least one anionic group, which is a negatively charged ionic group. Anionic groups may be generated from groups having ionizable substituents that can form anions, such as acidic substituents, or may be the anion in the salts of ionizable substituents. Representative examples of anionic groups include $—COO^-$, $—SO_3^-$, $—OSO_3^-$, $—HPO_3^-$, $—OPO_3^{-2}$, and $—PO_3^{-2}$. Representative examples of anionizable groups include $—COOH$, $—SO_3H$, $—PO_3H_2$, $—R'SH$, $—R'OH$, and $—SO_2NHCOR'$, where R' represents hydrogen or an organic group such as a substituted or unsubstituted aryl and/or alkyl group. Preferably, the attached group comprises a carboxylic acid group, a sulfonic acid group, a sulfate group, or salts thereof. For example, the attached group may be an organic group such as a benzene carboxylic acid group, a benzene dicarboxylic acid group, a benzene tricarboxylic acid group, a benzene sulfonic acid group, or salts thereof. Specific organic ionic groups are $—C_6H_4—CO_2H$, $—C_6H_4SO_3H$, or salts thereof. The attached organic group may also be a substituted derivative of any of these.

As another example, the modified pigment may comprise a pigment having attached at least one cationic group, which is a positively charged organic ionic group that may be generated from ionizable substituents that can form cations (cationizable groups), such as protonated amines. For example, alkyl or aryl amines may be protonated in acidic media to form ammonium groups $—NR'_2H^+$, where R' represent an organic group such as a substituted or unsubstituted aryl and/or alkyl group. Cationic groups may also be positively charged organic ionic groups. Examples include quaternary ammonium groups ($—NR'_3^+$) and quaternary phosphonium groups ($—PR'_3^+$). Here, R' represents hydrogen or an organic group such as a substituted or unsubstituted aryl and/or alkyl group. Preferably, the attached group comprises an alkyl amine group or a salt thereof or an alkyl ammonium group.

The amount of attached groups can be varied depending on the solvent and the desired properties of the dispersion. In general, the amount of attached organic groups is from about 0.001 to about 10.0 micromoles of organic group per square meter surface area of pigment (surface area as measured, for example, by nitrogen adsorption). Preferably, the amount of attached organic groups is between from about 0.1 to about 5.0 micromoles/m², more preferably between from about 0.1 to about 4.0 micromoles/m², and most preferably between from about 0.5 to about 3.0 micromoles/m². The amount attached can be varied depending on the specific attached group and can be adjusted depending on, for example, the size of the attached group or the functionality of the ionic group. Further, it is also within the scope of the present invention to have more than one type of attached group, such as a non-ionic or non-chargeable group, especially one capable of providing additional steric stabilization, on the modified pigment in order to provide for the best overall performance. In this case, the amount of the ionic or ionizable group is preferably greater than amount of the non-ionic group (on a molar basis).

The particulate material, such as a modified pigment or oxidized carbonaceous material, may be purified by washing, such as by filtration, centrifugation, or a combination of the two methods, to remove unreacted raw materials, byproduct salts, and other reaction impurities. The products may also be isolated, for example, by evaporation, including spray drying, or it may be recovered by filtration and drying using known techniques to those skilled in the art. In addition, the particulate material, such as a modified pigment or oxidized carbonaceous material, can be purified to remove any undesired free species, such as unreacted treating agents used to prepare them. Known techniques of ultrafiltration/diafiltration using a membrane or ion exchange may be used to purify the particulate material and remove a substantial amount of free ionic and unwanted species, if present. Also, an optional exchange of counterions can be used if the particulate material is a modified pigment or oxidized carbonaceous material whereby the counterions that form a part of the modified or oxidized pigment can be exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$.

The particulate material used in the dispersion of the present invention can have a wide range of BET surface areas, as measured by nitrogen adsorption, depending on the desired properties of the dispersion comprising the particulate material. As is known to those skilled in the art, a higher surface area will correspond to smaller particle size. For carbon black, this particle size is the aggregate particle size, which is the smallest unit of carbon black that can be dispersed. If a higher surface area particulate material is not readily available for the desired application, it is also well recognized by those skilled in the art that the particulate material may be subjected to conventional size reduction or comminution techniques, such as media, ball or jet milling, to reduce the material to a smaller particle size, if desired.

The dispersion of the present invention further comprises at least one solvent having a dielectric constant of ≤50. Suitable examples include alcohols, glycols, ethers (such as tetrahydrofuran or diethylether), ketones (such as acetone or methylethyl ketone), acetates (such as ethyl acetate), amides (such as dimethylformamide), sulfoxides (such as dimethylsulfoxide), hydrocarbons, and miscible mixtures thereof. The solvent may also further comprise water. However, since the dielectric constant of the solvent is low, the solvent is therefore not water alone nor is it a mixture comprising more than 50% by weight water. Thus, the solvent is a non-aqueous solvent and may further comprise less than 50% by weight water, such as ≤40%, ≤30%, ≤20%, or ≤10% by weight water.

The amount of particulate material present in the dispersion of the present invention can be varied depending on, for example, the type of particulate material and the type of solvent. However, the dispersions of the present invention are generally referred to as high loading dispersions. By "high" is meant that the amount of particulate material is ≥10% by weight based on the total weight of the dispersion. For example, the particulate material loading level may be ≥10%, ≥15%, ≥20%, ≥25, or ≥30% by weight based on the total weight of the dispersion. Preferably, for some applications, the dispersion comprises ≥20% or, more preferably, ≥25% by weight particulate material.

In one embodiment of the present invention, the dispersion further comprises at least one dispersant which forms associative structures in the solvent. By "associative structures" is meant an organized arrangement of dispersant molecules resulting from the interaction of groups of the dispersant, such as inverse micelles. Examples of suitable dispersants include, but are not limited to, polyalkylene oxides (such as polyethylene oxide or polypropylene oxide), polyesters (such as polycaprolactone, polyvalerolactone, poly(hydroxy stearic acid), or poly(hydroxyoleic acid), polyamides such as polycaprolactam, polyacrylates, and block copolymers having both a hydrophobic and a hydrophilic group. Additional examples include amine-functionalized derivatives (such as polyamine, tertiary amine, or quaternary ammonium functionalized derivatives) or acid functionalized derivatives (such as carboxylic acid or phosphonic acid functionalized deriviatives) of these, such as amine-funtionalized or amine-terminated polyalkylene oxides or acrylic polymers comprising amine or acid functional groups. Other suitable dispersants will be known to one skilled in the art or could be identified by adding the dispersant to the solvent above its critical micelle concentration (CMC) and determining if associative structures, such as inverse micelles, have formed. Particularly preferred are those dispersants that not only form associative structures in the solvent but also form such structures in the dispersion itself—i.e., in the presence of the particulate material. Techniques such as light scattering methods known to one skilled in the art can be used to detect the presence of such structures in either the solvent or in the dispersion.

For this embodiment, specific dispersants can be chosen based on the type of particulate material and the desired overall properties of the dispersion. For example, if the particulate material is a modified pigment comprising a pigment having attached at least one organic group, the dispersant preferably comprises at least one functional group chosen for the type of organic group attached to the pigment. For example, if the modified pigment comprises a pigment having attached at least one anionic group, at least one anionizable group, or a mixture thereof, it has been found that dispersants comprising at least one cationic functional group, at least one cationizable functional group, or a mixture thereof can preferably be used to produce dispersions of the present invention. Specific combinations include modified pigments having attached at least one carboxylic acid group, sulfonic acid group, or salt thereof and dispersants comprising at least one amine group or ammonium group. However, it is also possible, for this type of modified pigment, to produce dispersions of the present invention with a dispersant comprising at least one anionic functional group, at least one anionizable functional group, or a mixture thereof. Furthermore, if the particulate material is a modified pigment comprising a pigment having attached at least one cationic group, at least one cationizable group, or a mixture thereof, it has been found that dispersants comprising at least one anionic functional group, at least one anionizable functional group, or a mixture thereof can preferably be used to produce dispersions of the present invention. Finally, it has also been found that dispersants comprising at least one nonionic functional group (such as a polyether group) can be used to produce dispersions of the present invention if the modified pigment comprises a pigment having attached at least one ionic group, at least one ionizable group, or a mixture thereof.

The amount of dispersant can be varied depending on the type of particulate material, the solvent, and the loading level of particulate material. In general, the ratio of the amount of dispersant to the amount of pigment can be between about 0.01 to 1 up to about 2.5 to 1 and preferably is between about 0.1 to 1 up to about 1 to 1. While the use of a dispersant is optional, it has been found that dispersants that form associative structures in the solvent and, in particular, those that form the associative structures in the dispersion, can impart improved properties, such as stability and low viscosity, to the high loading dispersions of the present invention. This is also true even when the level of dispersant is high.

Thus, as described herein, the present invention relates to dispersions comprising a particulate material and a low dielectric constant solvent, with an optional dispersant, wherein the level of the particulate material is high and wherein the viscosity of the dispersion is low. By "dispersion" is meant a two-phase system comprising finely divided particles distributed throughout a liquid phase. These dispersions have also been found to be stable dispersions. By "stable" is meant that the dispersion properties do not change appreciably over time and/or with changes in a specific condition. The dispersion of particulate material remains a dispersion. Thus, for example, the particle size of the particulate material in the dispersion can be below 500 nm, preferably below 300 nm, more preferably below 200 nm, and most preferably below 150 nm, and this particle size does not change appreciably over time or with variations in temperature, even at the high particulate material loading levels described above. As discussed above, if the particulate material is a carbon black based pigment, the particle size would correspond to the aggregate particle size. As another example, the dispersion of the present invention does not develop high levels of precipitate over time. Thus, the solids level of the dispersion remains essentially unchanged. Therefore, it has surprisingly been found that stable high loading dispersions of particulate material can be formed in a low dielectric constant solvent (such as ≤50). It has further been found that such dispersions can be formed having a viscosity that is ≤50 cP, even when the particulate material loading level is high, including ≥10% by weight. This is particularly surprising for the embodiment of the invention in which the particulate material is an ionically modified particle, such as an oxidized carbonaceous material or a modified pigment comprising a pigment having attached at least one ionic or ionizable group. As noted above, it would be expected that these compositions would have high viscosity, particularly at high loading levels, in non-aqueous solvents since the chargeable groups attached to the pigments would not be expected to be charged in a non-aqueous system. These pigments would therefore be expected to interact with each other, thereby increasing the viscosity of the dispersion, particularly over time. Instead, it has been found that the viscosity of these dispersions is low and that this viscosity does not change appreciably over time.

The dispersions of the present invention can be prepared using any method known in the art. For example, the particulate material and solvent may be combined with agitation to produce a stable dispersion, and, if used, a dispersant may be added. Also, if the particulate material is dispersible in water, the aqueous solvent of this dispersion of the particulate material may be exchanged for the solvent of the dispersion. Examples of solvent exchange methods include diafiltration/ultrafiltration and addition of the solvent during evaporation of the aqueous solvent. Alternatively, if a dispersant is used, this can be combined with the particulate material, and the resulting combination can then be combined with the solvent. The pigment, dispersant, and solvent may be combined in any equipment known in the art, such as a media or ball, or other high shear mixing equipment. Various conventional milling media can be used. Other methods for forming the dispersion of the present invention will be known to one skilled in the art.

The dispersions of the present invention may be further purified or classified to remove impurities and other undesirable free species which can co-exist in the dispersion as a result of the manufacturing process. For example, the dispersions can be subjected to a classification step, such as filtration, microfiltration, or centrifugation, to substantially remove particles having a size above about 1.0 micron. The removal of impurities from the dispersions may also improve the performance of these dispersions when used in various applications, including, for example, ink compositions, coating compositions, or compositions used to prepare black matrices.

Therefore, the present invention further relates to compositions comprising the dispersions of the present invention. For example, the dispersions may be used in plastic compositions, non-aqueous inks or coatings, rubber compositions, paper compositions and textile compositions. In particular, these pigments may be used in non-aqueous compositions, including, for example, automotive and industrial coatings, conductive coatings, coating compositions for preparing masks or temporary masks in the preparation of imaged articles, paints, toners, adhesives, and inks, such as non-aqueous inkjet ink compositions, including industrial inkjet applications.

For example, the present invention further relates to a non-aqueous ink composition, such as a non-aqueous inkjet ink composition, comprising the dispersion of the present invention. The amount of dispersion used can be any amount such that the particulate material, such as a pigment, is present in the ink composition in an amount effective to provide the desired image quality (for example, optical density) without detrimentally affecting the performance of the ink. Typically, the dispersion is used in an amount such that the particulate material is present in an amount as low as about 0.1% by weight, preferably 0.5% by weight, and as high as about 30% by weight, preferably 25% by weight based on the weight of the ink. Suitable additives may also be incorporated in order to impart a number of desired properties while maintaining the stability of the dispersion and the resulting ink composition. For example, conventional surfactants and/or dispersants, humectants, drying accelerators, penetrants, cosolvents, and binders, as well as other additives known in the art, may be added. The amount of a particular additive will vary depending on a variety of factors but generally ranges between 0% and 40% by weight based on the total weight of the ink composition. It is also within the bounds of the present invention to use a mixture of dispersions of the present invention, comprising different particulate materials, as well as mixtures of the dispersions of the present invention and conventional dispersions of particulate materials.

The present invention also further relates to a non-aqueous coating composition, such as a curable coating composition, comprising the dispersion of the present invention. In one embodiment, such a coating composition may be used to prepare a black matrix, particularly the black matrix of the present invention, described in more detail below used, which can be used, for example, in the color filter of a liquid crystal display device. Also, if the particular material comprises an organic colored pigment, the coating composition may be used to prepare the color filter itself. The coating composition preferably further comprises a resin, such as a curable resin. Also, conventional cosolvents may also be added, such as butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, and mixtures thereof. Aqueous solvents may also be added, including, for example, water and water soluble alcohols, but the amount of water will be below 50% by weight.

The curable resin may be any resin known in the art. For example, the resin may be an epoxy bisphenol-A resin or an epoxy novolac resin. The resin may also be an acrylic resin, a polyimide resin, a urethane resin, a polyester resin, cellulose, or a gelatin. The resin is one that may be cured thermally or by any source of radiation such as, for example, infrared or ultraviolet radiation. In this way, the curable coating composition may be photosensitive (i.e. may be cured by irradiation) or thermosensitive (i.e., may be cured by changing temperature, such as by heating). When the resin is curable by irradiation, the curable coating composition may further comprise a photoinitiator, which generates a radical on absorbing light with the respective pigment. Also, monomers, such as acrylates, methacrylates, epoxides, or styrenics, may be included.

The curable coating composition can be formed with a minimum of additional components (additives and/or cosolvents) and processing steps. However, additives such as surfactants and cosolvents may also be included. For example, when a photosensitive resin is used, such as epoxy bisphenol-A or epoxy novolak, a photoinitiator can also be added. Monomers and/or oligomers may also be added.

The coating composition can be used to prepare a black matrix that can be used, for example, for a color filter in a liquid crystal display device. Thus, the present invention further relates to a black matrix composition comprising the dispersions of the present invention. The black matrix can be formed using any method known in the art. For example, the black matrix may be formed by applying the black matrix composition comprising a modified pigment onto a substrate, curing the resulting curable coating imagewise, and developing and drying the cured coating.

The present invention will be further clarified by the following examples which are intended to be only exemplary in nature.

EXAMPLES

Examples 1-12 describe the preparation of dispersions of the present invention.

Example 1

20.0 g of a modified colored pigment (prepared by drying Cab-O-Jet® 250 C colored pigment dispersion, an aqueous dispersion of a modified pigment comprising a cyan pigment having attached sulfonic acid groups commercially available from Cabot Corporation), 6 g Disperbyk BYK163 (an amine-functionalized dispersant available from BYK Chemie), 13 g Joncryl 611 (an acrylic copolymer available from Johnson Polymer, Inc.), and 61 g butyl acetate as solvent were metered into a vessel. To this was added 2 mm glass beads, and a dispersion was prepared by mixing on a Skandex mixer. The glass beads were removed using a paint strainer. The viscosity of the dispersion (20% pigment loading) was measured using a Brookfield viscometer (spindle 000) and found to be 5.4 cP at 100 RPM. The mean volume particle size (mV) of the particulate material in the dispersion was measured using a Microtrac® Particle Size Analyzer and found to be 0.67 µm. This dispersion, which included an acrylic copolymer, could be used as a non-aqueous coating composition.

Example 2

15.0 g of a modified colored pigment (prepared by drying Cab-O-Jet® 250 C colored pigment dispersion, an aqueous dispersion of a modified pigment comprising a cyan pigment having attached sulfonic acid groups commercially available from Cabot Corporation), 6 g Disperbyk BYK163 (an amine-functionalized dispersant available from BYK Chemie), 15 g Joncryl 611 (an acrylic copolymer available from Johnson Polymer, Inc.), and 64 g butyl acetate as solvent were metered into a vessel. To this was added 2 mm glass beads, and a dispersion was prepared by mixing on a Skandex mixer. The glass beads were removed using a paint strainer. The viscosity of the dispersion (15% pigment loading) was measured using a Brookfield viscometer (spindle 000) and found to be 7.2 cP at 100 RPM. The mean volume particle size (mV) of the particulate material in the dispersion was measured using a Microtrac® Particle Size Analyzer and found to be 0.17 µm. This dispersion, which included an acrylic copolymer, could be used as a non-aqueous coating composition.

Example 3

15.0 g of a modified colored pigment (prepared using 2.4 mmol/g sulfanilic acid and Pigment Red 254 and drying down the resulting aqueous dispersion), 6 g Disperbyk BYK163 (an amine-functionalized dispersant available from BYK Chemie), 15 g Joncryl 611 (an acrylic copolymer available from Johnson Polymer, Inc.), and 64 g butyl acetate as solvent were metered into a vessel. To this was added 2 mm glass beads, and a dispersion was prepared by mixing on a Skandex mixer. The glass beads were removed using a paint strainer. The viscosity of the dispersion (15% pigment loading) was measured using a Brookfield viscometer (spindle 000) and found to be 1.7 cP at 100 RPM. The mean volume particle size (mV) of the particulate material in the dispersion was measured using a Microtrac® Particle Size Analyzer and found to be 0.19 µm. This dispersion, which included an acrylic copolymer, could be used as a non-aqueous coating composition.

Example 4

15.0 g of a modified colored pigment (prepared by drying Cab-O-Jet® 554B colored pigment dispersion, an aqueous dispersion of a modified pigment comprising a violet pigment having attached sulfonic acid groups commercially available from Cabot Corporation), 6 g Disperbyk BYK163 (an amine-functionalized dispersant available from BYK Chemie), 15 g Joncryl 611 (an acrylic copolymer available from Johnson Polymer, Inc.), and 64 g butyl acetate as solvent were metered into a vessel. To this was added 2 mm glass beads, and a dispersion was prepared by mixing on a Skandex mixer. The glass beads were removed using a paint strainer. The viscosity of the dispersion (15% pigment loading) was measured using a Brookfield viscometer (spindle 000) and found to be 1.5 cP at 100 RPM. The mean volume particle size (mV) of the particulate material in the dispersion was measured using a Microtrac® Particle Size Analyzer and found to be 0.23 µm. This dispersion, which included an acrylic copolymer, could be used as a non-aqueous coating composition.

Example 5

28.8 g of a modified pigment comprising a carbon black having attached sulfonic acid groups (prepared using 6 µmol/ $m^2$ sulfanilic acid and Regal® 330 carbon black and drying down the resulting aqueous dispersion), 15.0 g Solsperse 32500 (an amine-functionalized dispersant available from Noveon), 94 g Dowanol PM (available from Dow) as solvent, 7.5 g tri(propylene glycol) diacrylate, and 15 g pentaerythritol triacrylate were metered into a vessel. To this was added 2 mm glass beads, and a dispersion was prepared by mixing on a Skandex mixer. The glass beads were removed using a paint strainer. The viscosity of the dispersion (18% pigment loading) was measured using a Brookfield viscometer (spindle 18) and found to be 6.48 cP at 100 RPM. The mean volume particle size (mV) of the particulate material in the dispersion was measured using a Microtrac® Particle Size Analyzer and found to be 0.074 µm. This dispersion, which includes curable monomers, could be used as a curable ink composition for industrial inkjet printing.

Example 6

8.8 g of a modified pigment comprising a carbon black having attached sulfonic acid groups (prepared using 6 µmol/ $m^2$ sulfanilic acid and Regal® 330 carbon black and drying down the resulting aqueous dispersion), 4.5 g Solsperse 32500 (an amine-functionalized dispersant available from Noveon), 28.9 g Dowanol PM (available from Dow) as solvent, 2.3 g tri(propylene glycol) diacrylate, and 4.5 g pentaerythritol triacrylate were metered into a vessel. To this was added 2 mm glass beads, and a dispersion was prepared by mixing on a Skandex mixer. The glass beads were removed using a paint strainer. The viscosity of the dispersion (18% pigment loading) was measured using a Brookfield viscometer (spindle 18) and found to be 6.48 cP at 100 RPM. The mean volume particle size (mV) of the particulate material in the dispersion was measured using a Microtrac® Particle Size Analyzer and found to be 0.074 µm. This dispersion, which includes curable monomers, could be used as a curable ink composition for industrial inkjet printing.

Example 7

20 g of a modified pigment comprising a carbon black having attached sulfonic acid groups (prepared using 6 µmol/ $m^2$ sulfanilic acid and Regal® 330 carbon black and drying down the resulting aqueous dispersion), 4 g Solsperse 20000 (an amine-functionalized dispersant available from Noveon), and 100 g methanol as solvent were metered into a vessel. To this was added 2 mm glass beads, and a dispersion was prepared by mixing on a Skandex mixer. The glass beads were removed using a paint strainer. The viscosity of the dispersion (16% pigment loading) was measured using a Brookfield viscometer (spindle S00) and found to be 18.0 cP at 100 RPM. The sample was subjected to accelerated aging at 50° C. for 36 hours, and the viscosity after accelerated aging was found to be 19.0 cP.

Example 8

9.98 g of a modified pigment comprising a carbon black having attached sulfonic acid groups (prepared using 6 µmol/ $m^2$ sulfanilic acid and Regal® 330 carbon black and drying down the resulting aqueous dispersion), 2.12 g Tergitol L-61 (a non-ionic polyether polyol dispersant available from Noveon), and 100 g methanol as solvent were metered into a vessel. To this was added 2 mm glass beads, and a dispersion was prepared by mixing on a Skandex mixer. The glass beads were removed using a paint strainer. The viscosity of the dispersion (9% pigment loading) was measured using a Brookfield viscometer (spindle S00) and found to be 2.5 cP at 100 RPM. Similar properties resulted when the ethylene glycol solvent was excluded. Therefore, it would be expected that, if the amount of pigment was increased to 10% loading in this formulation, similar results would also be observed.

Example 9

8.88 g of a modified pigment comprising a carbon black having attached sulfonic acid groups (prepared using 6 µmol/ $m^2$ sulfanilic acid and Regal® 330 carbon black and drying down the resulting aqueous dispersion), 0.82 g Solsperse 20000 (an amine-functionalized dispersant available from Noveon), and 40.84 g methanol and 49.5 g ethylene glycol as solvent were metered into a vessel. To this was added 2 mm glass beads, and a dispersion was prepared by mixing on a Skandex mixer. The glass beads were removed using a paint strainer. The mean volume particle size (mV) of the particulate material in this dispersion (9% pigment loading) was measured using a Microtrac® Particle Size Analyzer and found to be 0.015 µm. The sample was subjected to accelerated heat aging at 50° C. for 3 days, and the mean volume diameter particle size was found to be 0.015 µm. Similar properties resulted when the ethylene glycol solvent was excluded. Therefore, it would be expected that, if the amount of pigment was increased to 10% loading in this formulation, similar results would also be observed.

Example 10

20.1 g of a modified colored pigment comprising a yellow pigment having attached sulfonic acid groups (prepared by drying Cab-O-Jet® 270Y colored pigment dispersion, an aqueous dispersion of a modified pigment comprising a yellow pigment having attached sulfonic acid groups commercially available from Cabot Corporation), 13.5 g Disperbyk BYK163 (an amine-functionalized dispersant available from BYK Chemie), and 100 g n-butyl propionate as solvent were metered into a vessel. To this was added 2 mm glass beads, and a dispersion was prepared by mixing on a Skandex mixer. The glass beads were removed using a paint strainer. The viscosity of the dispersion (15% pigment loading) was measured using a Brookfield viscometer (spindle 18) and found to be 18 cP at 100 RPM. The mean volume particle size (mV) of the particulate material in the dispersion was measured using a Microtrac® Particle Size Analyzer and found to be 0.37 µm. The sample was subjected to accelerated heat aging at 50° C. for 3 days, and the mean volume diameter particle size was found to be 0.37 µm.

Example 11

19.9 g of a modified colored pigment comprising a magenta pigment having attached carboxylic acid groups (prepared using 0.7 mmol/g p-amino benzoic acid and Pigment Red 122 and drying down the resulting aqueous dispersion), 13.2 g Disperbyk BYK163 (an amine-functionalized dispersant available from BYK Chemie), and 101 g n-butyl propionate as solvent were metered into a vessel. To this was added 2 mm glass beads, and a dispersion was prepared by mixing on a Skandex mixer. The glass beads were removed using a paint strainer. The viscosity of the dispersion (15% pigment loading) was measured using a Brookfield viscometer (spindle 18) and found to be 11 cP at 60 RPM.

Example 12

10.8 g of a modified colored pigment (prepared by drying Cab-O-Jet® 740 colored pigment dispersion, an aqueous dispersion of a modified pigment comprising a yellow pigment having attached sulfonic acid groups commercially available from Cabot Corporation), 3.8 g Anti-Terra U (a salt of an unsaturated polyamine amide and lower molecular acid available from BYK Chemie), and 60 g 1-methoxy-2-propanol as solvent were metered into a vessel. To this was added 2 mm glass beads, and a dispersion was prepared by mixing on a Skandex mixer. The glass beads were removed using a paint strainer. The viscosity of the dispersion (14% pigment loading) was measured using a Brookfield viscometer (spindle 18) and found to be 11 cP at 60 RPM.

Comparative Example 1

17 g Regal® 250 carbon black (commercially available from Cabot Corporation), 3.06 g Tergitol L-61 (a non-ionic polyether polyol available from Noveon), and 100 g ethylene glycol as solvent were metered into a vessel. To this was added 2 mm glass beads, and, upon mixing, a paste was formed. Thus, while the loading level was similar to that of Examples 1-12 (14% pigment loading), no dispersion having low viscosity resulted.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A dispersion comprising a particulate material and a solvent, wherein
 a) the particulate material is present in an amount of ≥25% by weight based on the total weight of the dispersion;
 b) the solvent has a dielectric constant of ≤50; and
 c) the dispersion has a viscosity of ≤50 cP.

2. The dispersion of claim 1, wherein the dispersion further comprises a dispersant which forms associative structures in the solvent.

3. The dispersion of claim 2, wherein the dispersion further comprises associative structures of the dispersant.

4. The dispersion of claim 2, wherein the particulate material is a modified pigment comprising a pigment having attached at least one anionic group, at least one anionizable group, or a mixture thereof and wherein the dispersant comprises at least one cationic functional group, at least one cationizable functional group, or a mixture thereof.

5. The dispersion of claim 2, wherein the particulate material is a modified pigment comprising a pigment having attached at least one cationic group, at least one cationizable group, or a mixture thereof and wherein the dispersant comprises at least one anionic functional group, at least one anionizable functional group, or a mixture thereof.

6. The dispersion of claim 2, wherein the particulate material is a modified pigment comprising a pigment having attached at least one ionic group, at least one ionizable group, or a mixture thereof and wherein the dispersant comprises at least one nonionic functional group.

7. The dispersion of claim 2, wherein the particulate material is a modified pigment comprising a pigment having attached at least one anionic group, at least one anionizable group, or a mixture thereof and wherein the dispersant comprises at least one anionic functional group, at least one anionizable functional group, or a mixture thereof.

8. The dispersion of claim 1, wherein the particulate material comprises a blue pigment, a black pigment, a brown pigment, a cyan pigment, a green pigment, a white pigment, a violet pigment, a magenta pigment, a red pigment, a yellow pigment, an orange pigment, or mixtures thereof.

9. The dispersion of claim 1, wherein the particulate material is an oxidized carbonaceous material.

10. The dispersion of claim 1, wherein the particulate material is a modified pigment comprising a pigment having attached at least one organic group, wherein the organic group comprises at least one ionic group, at least one ionizable group, or a mixture thereof.

11. The dispersion of claim 10, wherein the pigment is a carbonaceous pigment or an organic colored pigment.

12. The dispersion of claim 10, wherein the pigment comprises a blue pigment, a black pigment, a brown pigment, a cyan pigment, a green pigment, a white pigment, a violet pigment, a magenta pigment, a red pigment, a yellow pigment, an orange pigment, or mixtures thereof.

13. The dispersion of claim 10, wherein the organic group comprises at least one carboxylic acid group, at least one sulfonic acid group, or salts thereof.

14. The dispersion of claim 10, wherein the organic group is a —$C_6H_4$—COOH group, a —$C_6H_4$—$SO_3$H group, or salts thereof.

15. The dispersion of claim 1, wherein the solvent is an alcohol, an ether, a ketone, an ester, an amide, a sulfoxide, a hydrocarbon, or a miscible mixture thereof.

16. The dispersion of claim 1, wherein the solvent further comprises ≤20% by weight water.

17. A coating composition comprising the dispersion of claim 1.

18. An ink composition comprising the dispersion of claim 1.

19. The ink composition of claim 18, wherein the ink composition is a non-aqueous inkjet ink composition.

20. A black matrix composition comprising the dispersion of claim 1.

21. A dispersion comprising a particulate material, a dispersant, and a solvent, wherein
 a) the particulate material is an oxidized carbonaceous material or a modified pigment comprising a pigment having attached at least one ionic group, at least one ionizable group, or a mixture thereof;
 b) the dispersant forms associative structures in the solvent;
 c) the solvent has a dielectric constant of ≤50; and
 d) the dispersion has a viscosity of ≤50 cP,
wherein the particulate material is present in an amount of ≥10% by weight based on the total weight of the dispersion.

22. The dispersion of claim 21, wherein the particulate material is present in an amount of ≥20% by weight based on the total weight of the dispersion.

23. The dispersion of claim 21, wherein the dispersion further comprises associative structures of the dispersant.

24. The dispersion of claim 21, wherein the pigment is a carbonaceous pigment or an organic colored pigment.

25. The dispersion of claim 21, wherein the pigment comprises a blue pigment, a black pigment, a brown pigment, a cyan pigment, a green pigment, a white pigment, a violet pigment, a magenta pigment, a red pigment, a yellow pigment, an orange pigment, or mixtures thereof.

26. The dispersion of claim 21, wherein the organic group comprises at least one carboxylic acid group, at least one sulfonic acid group, or salts thereof.

27. The dispersion of claim 21, wherein the organic group is a —$C_6H_4$—COOH group, a —$C_6H_4$—$SO_3H$ group, or salts thereof.

28. The dispersion of claim 21, wherein the particulate material is a modified pigment comprising a pigment having attached at least one anionic group, at least one anionizable group, or a mixture thereof and wherein the dispersant comprises at least one cationic functional group, at least one cationizable functional group, or a mixture thereof.

29. The dispersion of claim 21, wherein the particulate material is a modified pigment comprising a pigment having attached at least one cationic group, at least one cationizable group, or a mixture thereof and wherein the dispersant comprises at least one anionic functional group, at least one anionizable functional group, or a mixture thereof.

30. The dispersion of claim 21, wherein the particulate material is a modified pigment comprising a pigment having attached at least one ionic group, at least one ionizable group, or a mixture thereof and wherein the dispersant comprises at least one nonionic functional group.

31. The dispersion of claim 21, wherein the particulate material is a modified pigment comprising a pigment having attached at least one anionic group, anionizable group, or a mixture thereof and wherein the dispersant comprises at least one anionic functional group, at least one anionizable functional group, or a mixture thereof.

32. The dispersion of claim 21, wherein the solvent is an alcohol, an ether, a ketone, an ester, an amide, a sulfoxide, a hydrocarbon, or a miscible mixture thereof.

33. The dispersion of claim 21, wherein the solvent further comprises ≤20% by weight water.

34. A coating composition comprising the dispersion of claim 21.

35. An ink composition comprising the dispersion of claim 21.

36. The ink composition of claim 35, wherein the ink composition is a non-aqueous inkjet ink composition.

37. A black matrix composition comprising the dispersion of claim 21.

38. A dispersion comprising a particulate material, a dispersant, and a solvent, wherein
   a) the particulate material is an oxidized carbonaceous material or is a modified pigment comprising a pigment having attached at least one ionic group, at least one ionizable group, or a mixture thereof;
   b) the dispersant forms associative structures in the solvent;
   c) the solvent has a dielectric constant of ≤50; and
   d) the dispersion has a viscosity of ≤50 cP,
wherein the dispersion further comprises associative structures of the dispersant.

\* \* \* \* \*